(12) United States Patent
Goyal et al.

(10) Patent No.: US 12,327,245 B2
(45) Date of Patent: Jun. 10, 2025

(54) SYSTEMS AND METHODS FOR NESTED APPLICATION PROGRAMMING INTERFACES (APIS) FOR DISTRIBUTED PAYMENT PROCESSING SYSTEMS

(71) Applicant: Stripe, Inc., South San Francisco, CA (US)

(72) Inventors: Ameesh Goyal, South San Francisco, CA (US); Jack Dent, South San Francisco, CA (US); Wanghong Yuan, South San Francisco, CA (US); Seth Toren-Herrinton, South San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 103 days.

(21) Appl. No.: 18/087,339

(22) Filed: Dec. 22, 2022

(65) Prior Publication Data

US 2024/0211942 A1     Jun. 27, 2024

(51) Int. Cl.
*G06Q 20/38*     (2012.01)
*G06Q 20/40*     (2012.01)

(52) U.S. Cl.
CPC ........ *G06Q 20/389* (2013.01); *G06Q 20/401* (2013.01); *G06Q 20/405* (2013.01)

(58) Field of Classification Search
CPC ... G06Q 20/389; G06Q 20/401; G06Q 20/405
See application file for complete search history.

(56) References Cited

U.S. PATENT DOCUMENTS

| | | | |
|---|---|---|---|
| 2016/0125384 A1* | 5/2016 | Lemberger | G06Q 20/4015 705/44 |
| 2018/0232715 A1* | 8/2018 | Continanza | G06Q 20/085 |
| 2019/0304004 A1* | 10/2019 | Schwantes | G06Q 10/0836 |
| 2022/0327546 A1* | 10/2022 | Zhao | G06N 20/20 |
| 2024/0161076 A1* | 5/2024 | Raiskin | G06Q 30/0207 |

* cited by examiner

*Primary Examiner* — Raven E Yono
(74) *Attorney, Agent, or Firm* — Womble Bond Dickinson (US) LLP

(57) ABSTRACT

A method and apparatus for a first server computer system processing a transaction received from a second server computer system are described. The method may include receiving a request to perform a first transaction. The method may also include generating a second transaction originating from an account of the first server computer system, the second transaction comprising payment data associated with a user selected payment method for the first transaction. The method may also include transmitting the second transaction to a transaction interface of the first server computer system, and authorizing the second transaction with an authorization system using payment data associated with the user selected payment method for the first transaction to complete the first transaction.

20 Claims, 8 Drawing Sheets

SYSTEMS AND METHODS FOR NESTED APPLICATION PROGRAMMING INTERFACES (APIS) FOR DISTRIBUTED PAYMENT PROCESSING SYSTEMS

BACKGROUND

Merchants, such as grocers, car services, online marketplaces, etc., provide their products and services to consumers. Such merchants may employ agents to deliver their products and/or provide the actual services to the merchant's customers, provide digital goods directly to their customers, or ship physical goods to consumers. For example, a person acting on the merchant's behalf will drive a consumer in their own car, deliver food ordered through a merchant website, pick up and/or drop off clothes dry cleaned by the merchant, etc. As another example, merchants may provide a website, online marketplace, etc., to sell digital products, such as music, documents, art, unique tokens, etc., to consumers. Consumers therefore often engage, purchase, rent, etc. services and/or products of the merchant or the merchant's agent via a merchant interface, such as a merchant web page, application, or other interface.

These merchants, although providing systems for supplying products and/or services to consumers via their interface, often do not perform the financial processing associated with the transactions. Instead, merchants utilize commerce systems to process financial transactions for the products and/or services provided to consumers. Commerce systems may provide their transaction processing services to the merchant by way of software applications, web pages, application programming interfaces (APIs), etc. The merchant system integrates the commerce system software, APIs, web pages, etc. into the merchant interfaces to handle the processing of consumer transactions. Once integrated, the commerce system, on behalf of the merchant system, can perform processing of payments for goods or services including collecting credit card information, running credit cards, crediting a merchant account for the transaction, crediting agents responsible for the transaction, debiting a commerce system fee for processing the transaction on behalf of the merchant, interacting with authorization network systems (e.g., bank systems, credit card issuing systems, etc.), providing payouts for products/services rendered on behalf of the merchant, as well as other.

The types of payment options that a merchant may provide to their customers is expanding. For example, a digital wallet functions as a virtual or software version of a physical wallet and securely stores payment instrument details for one or more payment methods. For example, a digital wallet may store banking information (e.g., institution name, account number(s), routing details, etc.), credit card information (e.g., name on card, primary account number (PAN), card security code (CSC), expiration date, address, etc.), as well as other payment instruments by which a customer of the merchant system may provide payment for a good or service. The digital wallets may be maintained at the commerce system, a third party digital wallet and/or payment provider, etc. Thus, the commerce platform integrates the use of such expanded payment methods to the software applications, web pages, APIs, etc. provided to a merchant system.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
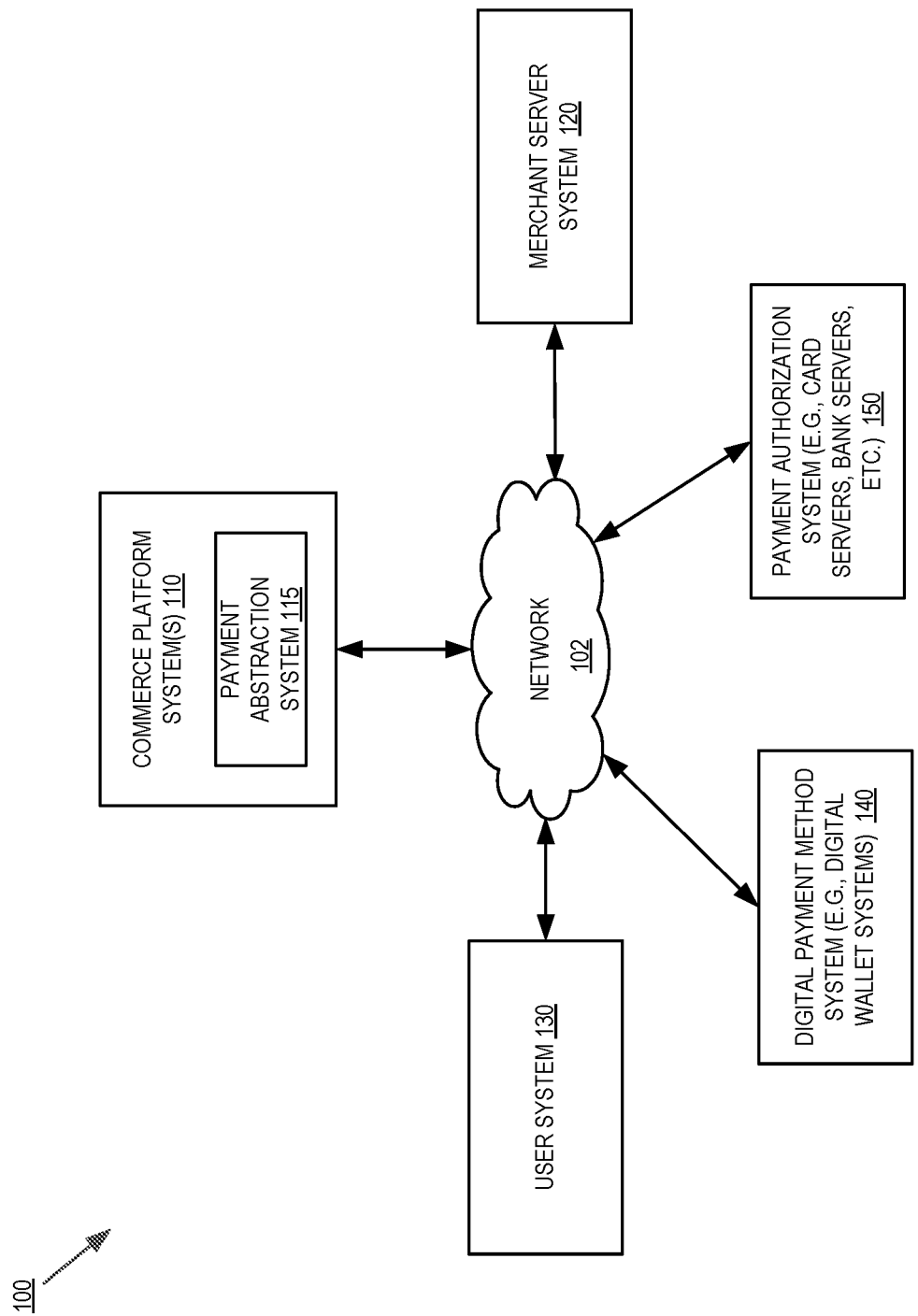
FIG. 1 is a block diagram of an exemplary system architecture for a commerce platform system leveraging nested APIs for processing transactions of remote systems.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "generating", "transmitting", "authorizing", "adding", "selecting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system 100 architecture for a commerce platform system leveraging nested APIs for processing transactions of remote systems. In one embodiment, the system 100 includes commerce platform server system(s) 110, a merchant server system 120, a user system 130, a digital payment method system (e.g., digital wallet system) 140, and a payment authorization system (e.g., a card server, bank server, etc.) 150. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system(s) 110 and merchant server system 120, digital payment method system 140, and payment authorization system 150 may also be one or more computing devices, such as one or more server computer systems, desktop computer systems, etc. that utilize distributed computing architectures. Furthermore, although not shown, any number of merchant server systems, user systems, digital payment method systems, and payment authorization systems may interact with the commerce platform system(s) 110, as discussed herein.

The commerce platform system(s) 110, merchant system 120, merchant user system 130, digital payment method system 140, and payment authorization system 150 may be coupled to a network 102 and communicate with one another using any of the standard protocols for the exchange of information, including secure communication protocols. In one embodiment, one or more of the commerce platform system(s) 110, merchant system 120, merchant user system 130, digital payment method system 140, and payment authorization system 150 may run on one Local Area Network (LAN) and may be incorporated into the same physical or logical system, or different physical or logical systems. Alternatively, the commerce platform system(s) 110, merchant system 120, merchant user system 130, digital payment method system 140, and payment authorization system 150 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system 120 and/or user system 130. For example, commerce platform system(s) 110 may manage merchant accounts held at the commerce platform, run financial transactions initiated at user system 130 performed on behalf of a merchant system 120, obtain payment information selected by a user of user system from digital payment method system 140, interact with a payment authorization system 150 to clear transactions, performing payouts to merchants and/or merchants' agents subsequent to a transaction, manage merchant and/or agent accounts held at the commerce platform system(s) 110, as well as other services typically associated with commerce platforms systems such as, for example, STRIPE™. For commerce platform systems that operate at scale, such as system 110, the number of transactions on the magnitude of millions or billions of transactions are processed each hour, day, month, etc. by the commerce platform system(s) 110. Each of these transactions is processed by the commerce platform system (s) 110, and data associated with the transaction is stored in a data store of the commerce platform system 110 (e.g., transaction data store 204 discussed below).

In embodiments, merchant server 120 utilizes one or more application programming interfaces (APIs) distributed by the commerce platform system(s) 110 to develop web pages, mobile applications, standalone applications, etc. that provide their products and/or services to user system 130. The APIs distributed by the commerce platform system(s) 110 enable the merchant application(s) to collect payments using API based functions, which are then processed by payment processing services of the commerce platform system(s) 110 via API based messaging. An example of such an API based approach for a commerce platform system distributing and using APIs for enabling merchant-user transactions is discussed in U.S. Pat. No. 10,949,822, entitled Methods and Systems for Providing Payment Interface Services Using a Payment Platform. For example, a merchant application may collect payment information from a user by embedding commerce platform system API functions with a merchant application, such as a selection of a digital payment method provided by commerce platform system(s) 110 or by digital payment method system 140. The payment information is then used by commerce platform system(s) 110 when interacting with payment authorization system 150 to clear a transaction and provide payouts.

However, as the number and types of payments methods increases, so does the complexity of payment processing services for merchant server system 120 and/or digital payment method system 140. Rather than have this increased complexity reflected in the development of merchant applications and/or interactions with payment authorization system 150, in embodiments, commerce platform system(s) 110 includes a payment abstraction system 115. Payment abstraction system 150, as will be discussed in greater detail herein, is configured to receive an initial transaction with a user selected payment type. The payment type may be a digital payment method provided by the commerce platform system(s) 110, such as the LINK™ payment method. The payment type may also be a digital payment method provided by the digital payment method system 140, such as a PAYPAL™, a REVOLUT PAY™, a GOOGLE PAY™, an APPLE PAY™, or other digital payment method. In embodiments, these payment methods can be a container with other payment methods. For example, the LINK™ payment method can contain a stored value balance and payment card data. The user system 130 can select the contained payment method. If a stored value balance is selected, it is further processed by the digital payment method system 140; if a card is selected, it is further processed by the payment authorization system 150 Payment abstraction system 115 may receive/intercept this selection as part of a first transaction associated with a merchant account of merchant server system 120. By intercepting this first transaction, payment abstraction system 115 then generates a second, commerce platform system(s) 110 initiated transaction to carry out the first transaction. In some embodiments, the type of transaction being a digital payment method based transaction is identified by the payment abstraction system 115 for incoming transactions, and causes the interception and second transaction generation as discussed herein.

As will be described herein, the second, commerce platform system(s) 110 initiated transaction may be generated as a merchant transaction for a merchant account of the commerce platform system(s) 110. This second transaction, which has the payment information, merchant information, as well as other information sufficient to detail the transaction, user associated with the transaction, merchant for which the transaction is being performed on behalf of, selected payment method, etc. extracted from the first transaction, is then transmitted from the payment abstraction system 115 back to the commerce platform system(s) 110 as a new transaction. This second transaction, which can be identified by the payment abstraction system 115 as originating from the commerce platform system's merchant account, however, is allowed to proceed to payment processing by the service's of the commerce platform system(s) 110. The payment processing utilizes the information, such as selected digital payment method, user account information, etc. to clear the second transaction at a corresponding payment authorization system, such as payment authorization system 150. Upon clearance, payment authorization system 150 performs payouts to the respective parties of the transaction, such as payment sent to the merchant server system 120, less any fees owed to the commerce platform system(s) 110 for its performance of the payment processing services. In some embodiments, commerce platform system(s) 110 may alternatively perform a payout for a transaction even when the underlying transaction processed by payment authorization system 150 does not clear, settle, succeed, etc.

In embodiments, the interception and then generation of a second transaction simplifies a process of accepting and using new payment methods. For example, new digital wallet systems, such as those provided by commerce platform system 110 and/or digital payment method system 140, may be expanded without changing a payment processing service flow at merchant applications provided to user system. Rather, the commerce platform system(s) 110 generating and clearing the transaction enable the services of the commerce platform system(s) 110 to integrate the new payment methods thereby reducing engineering effort and time imposed on merchant systems to develop and update applications for such expanded remote transaction offerings.

Furthermore, this also allows the user system 130 to have more payment selections, which in turn can improve the conversion rate performance for the merchant system 120. Additionally, user data security is improved in that payment details, such as payment instrument, underlying funding sources, etc. associated with the user system may be abstracted and not revealed to the merchant system during payouts, transaction notifications, etc. For example, a transaction summary provided by commerce platform systems(s) 110 may reveal to a merchant that a user used a LINK™ payment method, and not that a VISA™ credit card ending in 1234 was the instrument that funded the payment method. As a result, user privacy is improved and potential exposure of sensitive information reduced.

In embodiments, each transaction (e.g., the first merchant system 120 transaction and the second, commerce platform system(s) 110's merchant account transaction are reflected in a logical ledger of a transaction data store (e.g., transaction data store(s) 204). Furthermore, successfully clearing a transaction with a payment authorization system 150 enables the logical ledger to be updated to zero out a ledger balance (e.g., a transaction for $X was received, and a payout of $Y=X was processed, and (X−Y)=$0) to ensure that all funds managed by the commerce platform system are properly obtained and disbursed. Because each incoming transaction processed by commerce platform system 110 is added to the logical ledger that tracks, for example, transaction amounts, expected payouts, expected collections, etc., in embodiments, by generating a second, commerce platforms system 110 transaction, an additional logical ledger entry is created that doubles a transaction amount. Therefore, in embodiments, the receipt of the commerce platform system(s) 110 second transaction causes the payment abstraction system 115 to generate an inverse logical ledger entry to cancel out the balance tracking impact of the second transaction. By doing this, the logical ledger balance can be maintained without showing a doubled spending/accounting of the original transaction (e.g., the first transaction). Therefore, this additional logical ledger entry creation, which is the inverse of the second transaction, ensures that the benefits of the abstracted payment processing of digital payment methods can be realized without damaging the ability of the commerce platform system(s) 110 account balance tracking.

Figure 2:
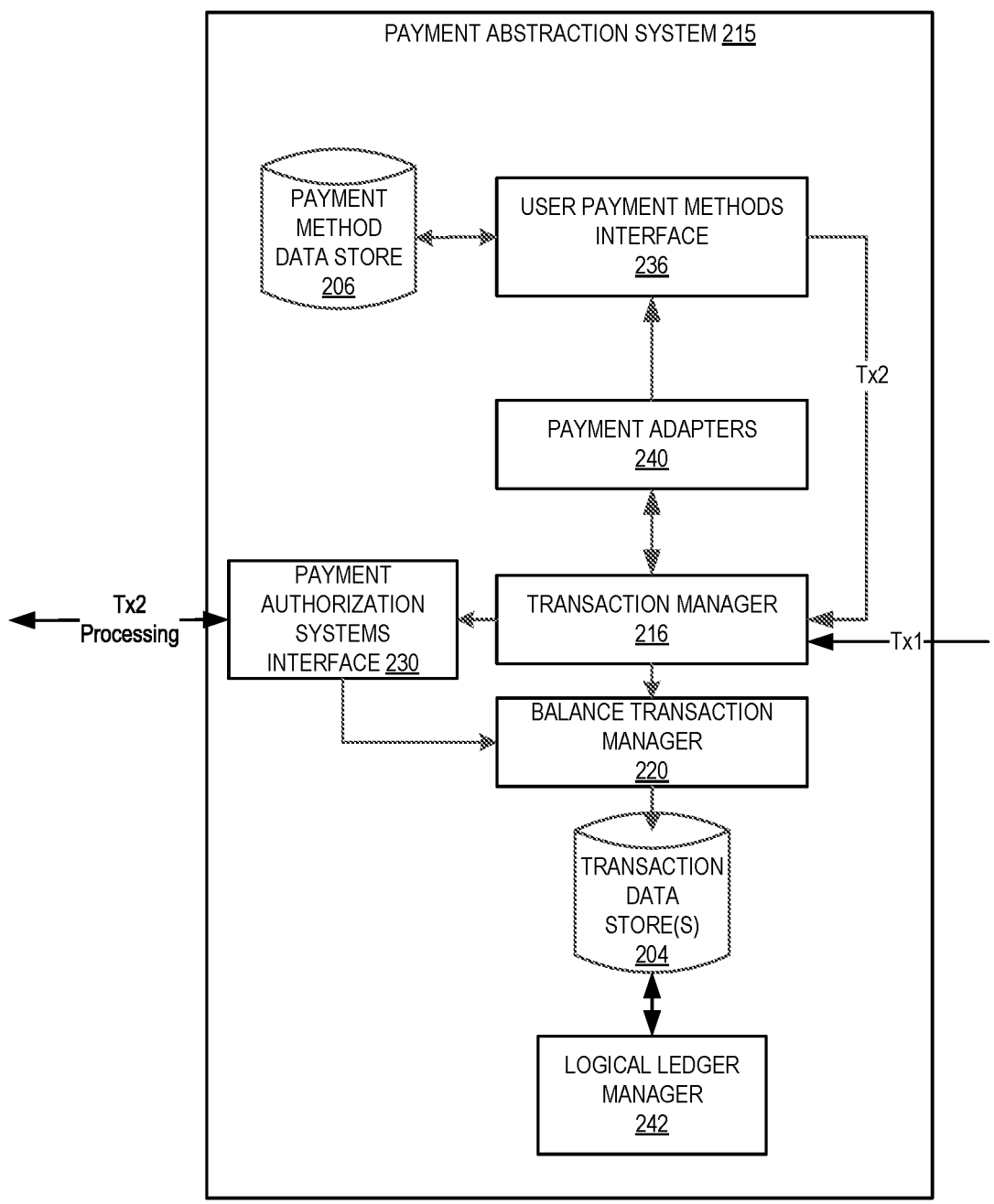
FIG. 2 is a block diagram of one embodiment of a payment abstraction system of a commerce platform system.

FIG. 2 is a block diagram of one embodiment of a payment abstraction system 215 of a commerce platform system. Payment abstraction system 215 provides additional details for the payment abstraction system 115 of the commerce platform system(s) 110 discussed above in FIG. 1.

In one embodiment payment abstraction system 110 includes a transaction interface 216, payment adapters 240, user payment methods interface 236, payment authorization systems interface 230, balance transaction manager 220, logical ledger manager 242, transaction data store 204, and payment method data store 206. These systems may be implemented as software, hardware, firmware, or a combination thereof. In some embodiments, these systems may be implemented as services at one or more processing systems of a distributed processing system of the commerce platform system(s) 110, and may interact with one another over a communications network. In other embodiments, these systems may be implemented as processes executing on the same computing system. In yet other embodiments, a portion of the systems may be distributed and implanted at distributed resources, and the remaining systems implemented on a single processing system.

In embodiments, the transaction manager 216 is responsible for receiving and processing transactions originating from merchant system(s) (not shown) and user system(s) (not shown) (e.g., from merchant applications), as well as those originating from the payment abstraction system (e.g., from a merchant account of the commerce platform systems(s) 110). For example, the transactions may be financial transactions performed by transaction processing system 210 including, but not limited to, purchases, refunds, credit requests, loan requests, subscriptions, etc. Furthermore, the transaction manager 216, in embodiments, is exposed as an API endpoint enabling the transaction to be received as API based messaging.

Payment adapter 240 is responsible for monitoring properties of transactions received by the transaction manager. In embodiments, the properties include a payment method type of an incoming transaction. For example a first transaction, illustrated as Tx1 in FIG. 2, may be a merchant system originated transaction in which a user has selected a digital payments method associated with the commerce platform system(s) 110. Upon detecting this type of transaction, the transaction is forwarded to the user payment methods interface 236, prior to transaction processing operations performed by transaction manager 216 as discussed below.

User payment methods interface 236 is responsible for obtaining payment details for the user-selected digital payments method from payment method data store 206. In embodiments, the obtaining by user payment methods interface 236 includes an authentication process of the user, such as confirmation of a username and password associated with the user's digital payment method, successful completion of a $2^{nd}$ factor of authentication, obtaining a cookie or key from the user system, etc. Thus, care is taken by the user payment methods interface 236 to securely authenticate the user seeking to use the digital payments method prior to obtaining the user's payment details from the payment method data store 206. The payment details may include one of the contained sub-payment method(s). Once obtained, the user payment methods interface 236 generates a second transaction that embeds the user payment details and the merchant information for which the transaction is being performed on behalf of (e.g. Tx1 information embedded in Tx2 in FIG. 2). However, this second transaction is generated as originating from a merchant account of the commerce platform system(s) 215, and transmitted to the API endpoint of the transaction manager 216.

In some embodiments, user payment methods interface 236 further determines when the second transaction is to be applied to the user account. Note that application of the second transaction to the user account is different from the generation and sending of the second transaction to the transaction manager 216. The application to the user's account determined by user payment methods interface 236, in embodiments, refers to when and how to debit or charge against the user's account for the amount of the second transactions, which is included as metadata within the second transaction. In embodiments, user payment methods interface 236 may obtain and/or determine information related to the user's digital payment method account, such as information indicative of a total balance over time, a net balance for a period of time (e.g., a total based on debits and credits for the account over the period of time), an average transaction amount, a predicted amount of a user's credit/debit limit consumption, etc. Then, in embodiments, the information related to the user's digital payment method account may be used to determine the application of the second transaction's amount to the payment method. In some embodiments, the application, such debiting the user's digital payment method account may be delayed for a period of time (e.g., corresponding to when the user's account is predicted to have a maximum balance, a balance predicted to be sufficient to cover a debit, a time when a user is predicted to have sufficient credit to cover the second transaction, etc.). The second transaction's application to the user's account is distinct from the generation/transmission of the second transaction to the transaction manager 216, and may be delayed to improve the likelihood that the user's transaction will be successfully authorized.

In some embodiments, the information related to the user's digital payment method account may be indicative of a transaction failure, for example when the historical balance, credit limit, etc. will not be sufficient to satisfy the second transaction regardless of when application occurs. In other embodiments, the transaction may satisfy one or more conditions, such as exceeding a threshold amount, exceeding an amount related to the user's historical transaction information, etc. In either scenario, user payment methods interface 236 may determine to offer an installment payment plan for the application of the second transaction's amount to the digital payments method account of the user. In this embodiment, the user payment methods interface 236 may query the user system (not shown) with a request to opt into an installment payment plan in which at least a portion of the amount of the second transaction is deferred and/or periodically satisfied over time by periodically applying smaller transactions against the user's account until the amount of the second transaction is satisfied. In this embodiment, if consented to by the user, the second transaction may be transmitted, and authorized, and at least a portion of the amount of the transaction delayed and/or satisfied over one or more periodic payments. Payment adapters 240 does not intercept the second transaction as it is a commerce platform system transaction being performed on behalf of a merchant system. Thus, transaction manager 216 performs one or more transaction operations to clear the transaction, such as interacting with a payment processing system via interface 230, and apply the transaction against a user's payment method account.

Furthermore, in response to the processing of the transaction by transaction manager 216, balance transaction manager 220 generates a logical ledger entry indicative of a charge entry having the transaction amount associated with the second transaction, and stores the charge entry in the logical ledger entry maintained in the transaction data store(s) 204. Furthermore, balance transaction manager 220 generates a second, inverse logical ledger entry that is added to the logical ledger as a payment method type transaction also having the transaction amount. Then, when the payment authorization systems interface 230 clears the transaction 230 (e.g., receives confirmation of a successful transaction and funds have been moved from the authorization system to the merchant system), balance transaction manager 220 receives this confirmation and records a third logical ledger entry in transaction data store 240 as a payment ledger entry for the first transaction. These three balance transactions, when processed by the logical ledger manager 242 as part of a ledger reconciliation process serve to ensure a proper flow of funds is reflected in the ledge. That is, the ledger reflects the flow of funds to the merchant as a result of the transaction, and zeros the second transaction generated for the merchant account of the commerce platform system 110.

Therefore, the transaction interception and generation of a second transaction enables the payment abstraction system 215 to easily adapt to new payment methods with minimal effort imposed on the merchant system, as well as limit exposure of user payment information through payment source abstraction.

Figure 3:
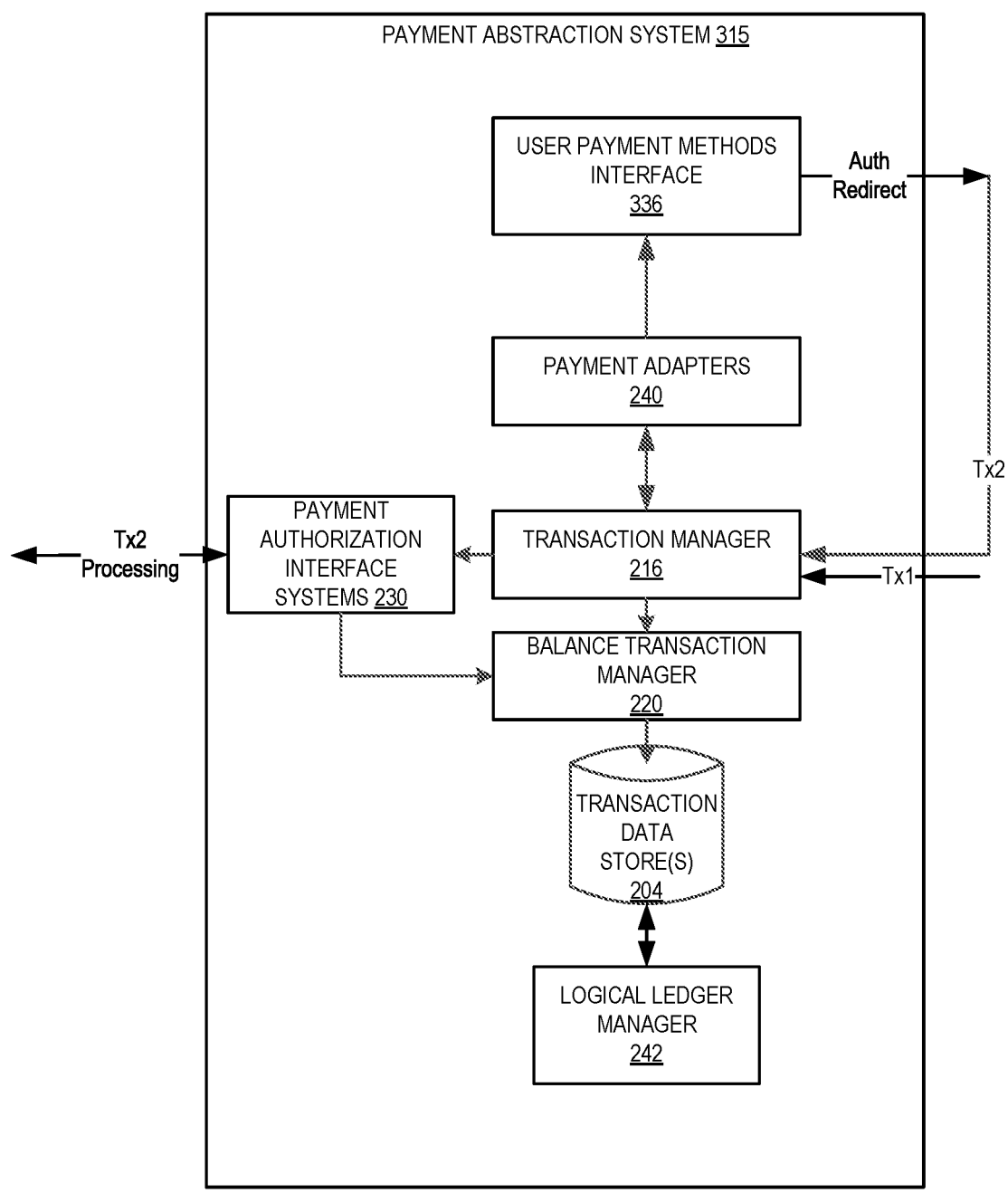
FIG. 3 is a block diagram of another embodiment of a payment abstraction system of a commerce platform system.

FIG. 3 is a block diagram of another embodiment of a payment abstraction system 315 of a commerce platform system. Payment abstraction system 315 provides additional details for the payment abstraction system 115 of the commerce platform system(s) 110 discussed above in FIG. 1.

In the embodiment of FIG. 3, the corresponding systems (e.g., transaction manager 216, payment adapters, balance transaction manger 220, and the other systems) perform the functions discussed above in FIG. 2. However, in the embodiment of FIG. 3, payment method data store 206 is not included, and the first transaction is received from a digital payment method system (e.g., system 140). Rather, user payment methods interface 336 upon receiving an intercepted transaction determines that the payment method selected is associated with a remote digital payment method system (e.g., digital payment method system 140). In response to determining the remote system digital payment method, rather than generating a second transaction as discussed above in FIG. 2, user payment methods interface 336 initiates a user authorization redirection enabling the user to authenticate to the remote digital payment method system 140, which upon successful authentication generates the second transaction received by transaction manager.

In the embodiment of FIG. 3, payment abstraction system 315 enables the remote digital payment method system (e.g., system 140) to act as a payment processing system for user storing their payment details at the remote digital payment method system, which may be provided to user as a payment processing selection. However, the remote digital payment method system need not generate payment processing services, and may instead generate the second transaction as discussed above (e.g., with data indicative of the original transaction, merchant for which transaction is being performed, etc.). Balance transaction manager 220 uses the information within the two transactions to ensure the zeroing out, and non-double accounting, discussed above.

Furthermore, and beneficially, remote digital payment method systems may perform not only payment detail storage for its uses, but also appear to offer payment processing services. This may help to promote user confidence in the systems (e.g., remote digital payment method system) that they typically would interact with during transactions. Additionally, the remote digital payment method system's use of the payment abstraction system 315 enables the remote digital payment method system to expand its service offerings to uses without having to implement the expanded service offerings.

Figure 4A:
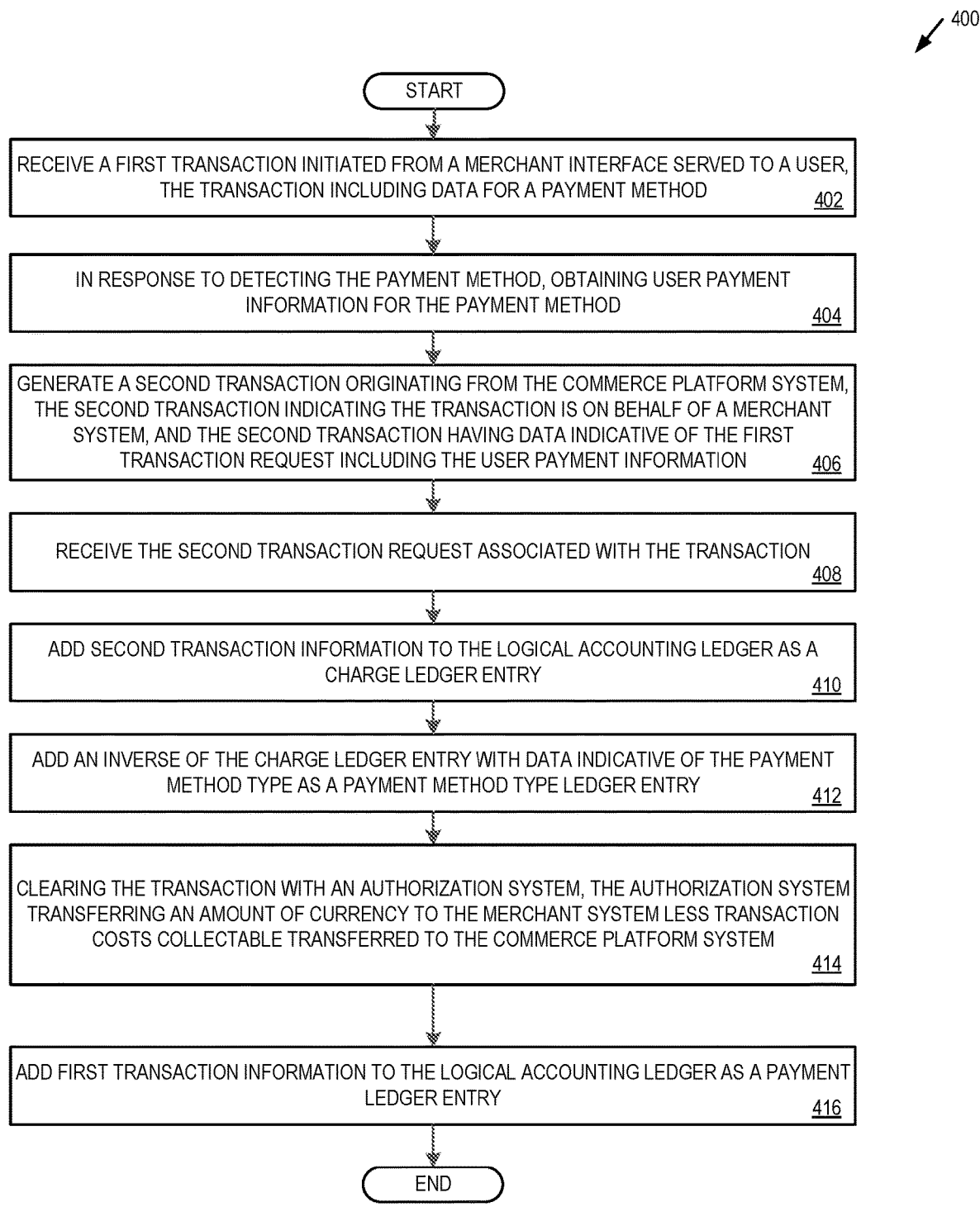
FIG. 4A is a flow diagram of one embodiment of a method for processing a transaction between remote systems by a payment abstraction system using nested APIs.

FIG. 4A is a flow diagram of one embodiment of a method for processing a transaction between remote systems by a payment abstraction system using nested APIs. The method 400 is performed by processing logic that may comprise hardware (circuitry, dedicated logic, etc.), software (such as is run on a general purpose computer system or a dedicated machine), firmware, or a combination. In one embodiment, the method 400 is performed by a payment abstraction system (e.g., payment abstraction system 115 or 215 of a commerce platform system 110).

Processing logic beings by receiving a first transaction initiated from a merchant interface served to a user, the transaction including data for a payment method (processing block 402). As discussed herein, the transaction may be received as an API based message at an API endpoint of a payment abstraction system. Furthermore, the API based message may include information, such as a selection of a digital payment method of a commerce platform system, a transaction amount, parties to the transaction, as well as other information.

In response to detecting the payment method, processing logic obtains user payment information for the payment method (processing block 404). The obtaining can include performing one or more user authentication to ensure the identity of the user/system seeking to use the payment method. In response to a successful authentication, the payment information may be obtained from a data store of the payment abstraction system. The payment information can include a payment instrument identifier (e.g., a card PAN, a bank account routing number, etc.), authentication system associated with the payment instrument (e.g., VISA™), additional codes or identifiers (e.g., a CSC), a user's name or address associated with the payment instrument, etc. In embodiments, this information is provided from a user to the digital payment method system prior to the transaction, so that it can be recalled and used during the transaction without effort on the user's behalf to supply the information, and without risking potential exposure during network transmission of the information.

Processing logic generates a second transaction originating from the commerce platform system, the second transaction indicating the transaction is on behalf of a merchant system, and the second transaction having data indicative of the first transaction request including the user payment information (processing block 406). The second transaction is the merchant account transaction for a merchant account maintained by the commerce platforms system. In embodiments, the commerce platform system's merchant account is not associated with a remote merchant, and thus may be re-used for any merchant system having a user making the digital payment method selection.

In embodiments, processing logic generates and transmits the second transaction at a select time and/or with select parameters. In embodiments, processing logic selects a rule from a set of one or more rules for determining when to generate the second transaction based on an analysis of a user associated with the first transaction, the second server computer system, the payment data associated with the user selected payment method, properties of the first transaction, or a combination thereof. For example, a user having payment details stored with the commerce platform for a set of transactions tracked over a period of time enables processing logic to detect, for example, a time when a transaction is most likely to result in an authorized transaction. In embodiments, transaction amounts, whether a transaction was authorized, a date of the authorization, etc. may all be collected for setting rules for determining when the generate the second transaction. Thus, the second transaction generation and transmission may be deferred a maximum period of time in order to maximize the likelihood of a user's transaction clearing as determined from a transaction generation rule. As another example, processing logic may use extrinsic factors when generating the transaction. In an embodiment, a currency of the first transaction and the second transaction may be different, with processing logic selecting the second currency to maximize a fee collectible when a transaction is completed based on currency exchange rates, to present an end user with a local currency and the merchant with their local currency when such currencies are different, as well as other reasons to process the first transaction in a different currency from the transaction below. Other factors may be used to determine when to generate the second transaction.

Processing logic then receives the second transaction request associated with the transaction (processing block 408). The second transaction may be transmitted from the payment abstraction system to the API endpoint as any other merchant originated transaction.

After receipt of the second transaction, processing logic adds second transaction information to the logical accounting ledger as a charge ledger entry (processing block 410), and further adds an inverse of the charge ledger entry with data indicative of the payment method type as a payment method type ledger entry (processing block 412). These two logical ledger entries in effect zero each other out so that the second transaction does not cause a double accounting for the original transaction. In other words, the first transaction and the second transaction will not be counted twice for the same transaction.

Processing logic clears the transaction with an authorization system, the authorization system transferring an amount of currency to the merchant system less transaction costs collectable transferred to the commerce platform system (processing block 414). Processing logic then adds first transaction information to the logical accounting ledger as a payment ledger entry (processing block 416). In embodiments, the addition of the first transaction information represents the successful clearance of the transaction, and payment to the merchant system for the transaction. Thus, funds flow directly from the authorization system (or a bank associated with the authorization system) to the merchant system that originated the transaction, less any payment processing service fees that may be collectable by the commerce platform system. These fees may be transmitted directly to the commerce platform system. Thus, both the funds flow and the logical tracking of the funds flow (via the logical accounting ledger) are managed in a way that reconciliation of the ledger reflects the actual flow of funds. Furthermore, the goals of user data privacy protection and non-exposure are furthered, while also enabling expanded service offering to merchant systems.

Figure 4B:
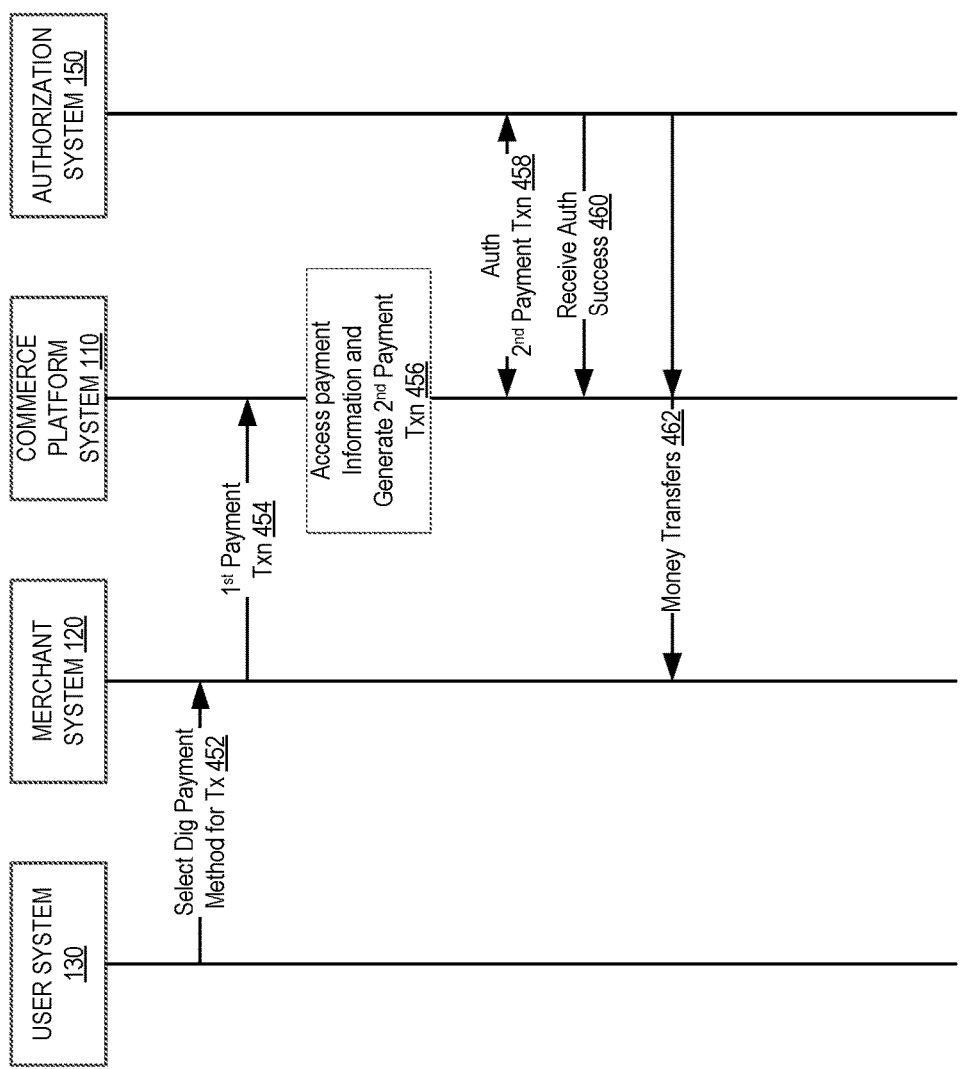
FIG. 4B is a flow diagram of one embodiment for messaging between remote systems during a process for processing a transaction between remote systems by a payment abstraction system using nested APIs.

FIG. 4B is a flow diagram of one embodiment 450 for messaging between remote systems during a process for processing a transaction between remote systems by a payment abstraction system using nested APIs. The messaging and the process for processing the transaction can be performed by processing logic that may comprise hardware (circuitry, dedicated logic, etc.), software (such as is run on a general purpose computer system or a dedicated machine), firmware, or a combination.

The process begins when a digital payment method selection for a transaction is transmitted 452 from user system 130 to merchant system 120. The transmission may include, for example, a selection within a web page user interface provided for the transaction, a mobile application having a transaction interface, a standalone application having a user interface, etc.

The merchant system 120 then in turn transmits a first payment transaction 454 to the commerce platform system 110. The first payment transaction 454 may be transmitted as an API message to an API endpoint of the commerce platform system 110. The API message can include the user selection of the digital payment method selection, authentication credentials, transaction amount, merchant identifiers, user identifiers, as well as other information.

The commerce platform system 110 accesses payment information and generates/transmits a second payment transaction 456. The access to the user's payment information, in embodiments and as discussed herein, may be predicated on various authentications of the user. For example, a primary authentication may be performed (e.g., verifying a username and password associated with the digital payment method), and one or more second authentication factors may be verified, before the commerce platform system 110 accesses the user's payment information. After accessing the payment information, the second transaction is transmitted to the commerce platform system 110 as a merchant transaction, but having the transaction information, user payment information, on-behalf of the merchant information, and other information embedded in the second transaction. Furthermore, the second transaction may be transmitted to the API endpoint that is exposed to merchant systems, and thus the second transaction can be received and processed as other merchant initiated transaction.

Because the second transaction is commerce platform system 110 initiated, an authorization process 458 for the second transaction is performed 458 with an authorization system. This can include the authorization system verifying account details, determining if a CSC matches a PAN, determining is a user's information matches card information on file, etc.

In response to an authorization by authorization system 150, an authorization success message is transmitted 460 to the commerce platform system 110. This in turn can cause the commerce platform system 110 to transmit a completion message to the merchant system 120 to enable the merchant to notify the user system 130 of the transaction completion. Authorization system 150 further, upon successful authorization, causes a funds transfer 462 to the merchant system 120, less any fees for the transaction processing performed by commerce platform 110 and that are transferred directly to the commerce platform system 110.

As discussed above, because both the first transaction and the second transaction received by commerce platform system 110 relate to the same user-merchant transaction, commerce platform performs the logical ledger entry operations discussed above to prevent double accounting for the same transaction. Additionally, user data may be protected from exposure when reporting the successful authorization and/or when providing merchant accountings.

Figure 6A:
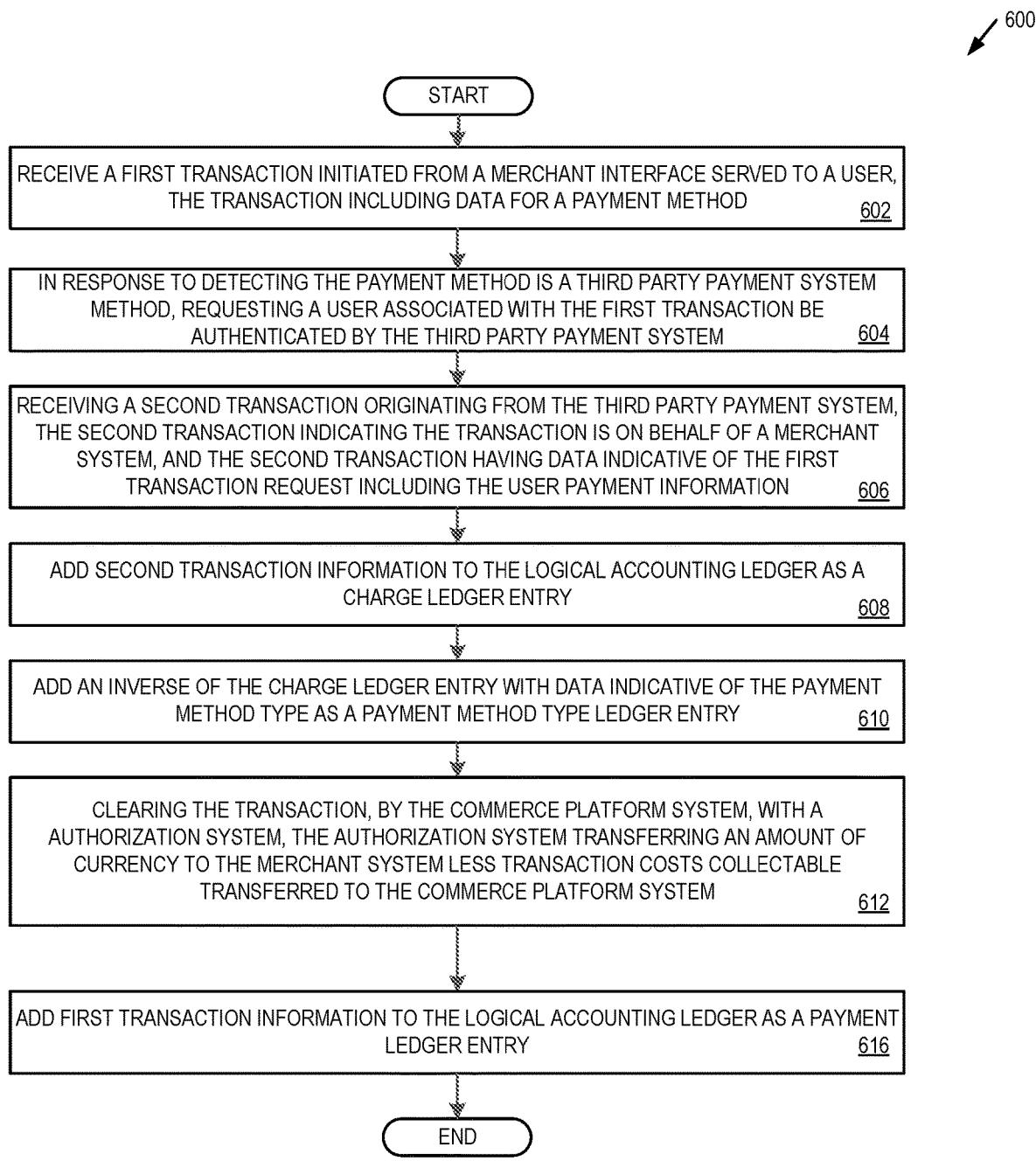
FIG. 6A is a flow diagram of another embodiment of a method for processing a transaction between remote systems by a payment abstraction system using nested APIs.

FIG. 6A is a flow diagram of another embodiment of a method 600 for processing a transaction between remote systems by a payment abstraction system using nested APIs. The method 600 is performed by processing logic that may comprise hardware (circuitry, dedicated logic, etc.), software (such as is run on a general purpose computer system or a dedicated machine), firmware, or a combination. In one embodiment, the method 600 is performed by a payment abstraction system (e.g., payment abstraction system 115 or 215 of a commerce platform system 110). Furthermore, the method 600 includes similar operations to those discussed above in FIG. 4A. Therefore, for sake of brevity, detailed discussion of overlapping operations is not repeated below, and can be referenced above in FIG. 4A.

Processing logic beings by receiving a first transaction initiated from a merchant interface served to a user, the transaction including data for a payment method (processing block 602).

In response to detecting the payment method is a third party payment system method, processing logic requests a user associated with the first transaction to be authenticated by the third party payment system (processing block 604). In embodiments, the detected third party payment system method can include a digital payment method provided by a remote system (e.g., system 140). Furthermore, the requested authentication can cause the third party payment system to interact with the merchant that originated the transaction to authorize the user (e.g., via one or more authentication operations performed between the user and the third party payment system).

Processing logic receives a second transaction originating from the third party payment system, the second transaction indicating the transaction is on behalf of a merchant system, and the second transaction having data indicative of the first transaction request including the user payment information (processing block 606). The second transaction is received from the third party payment system, which enables the third party payment system to act as a payment processor, but in fact use the services of the commerce platforms system to process payment for the transaction. However, the third party payment system maintains the user's payment information, and therefore may be more trusted by the user with respect to processing the payment for the transaction, as the user may not be familiar with the commerce platform system.

After receipt of the second transaction from the third party payment system, processing logic adds second transaction information to the logical accounting ledger as a charge ledger entry (processing block 608), and further adds an inverse of the charge ledger entry with data indicative of the payment method type as a payment method type ledger entry (processing block 610). As discussed above, these two logical ledger entries in effect zero each other out so that the second transaction does not cause a double accounting for the original transaction.

Processing logic clears the transaction with an authorization system, the authorization system transferring an amount of currency to the merchant system less transaction costs collectable transferred to the commerce platform system (processing block 612). Processing logic then adds first transaction information to the logical accounting ledger as a payment ledger entry (processing block 616). As discussed above, the addition of the first transaction information represents the successful clearance of the transaction, and payment to the merchant system for the transaction.

Figure 6B:
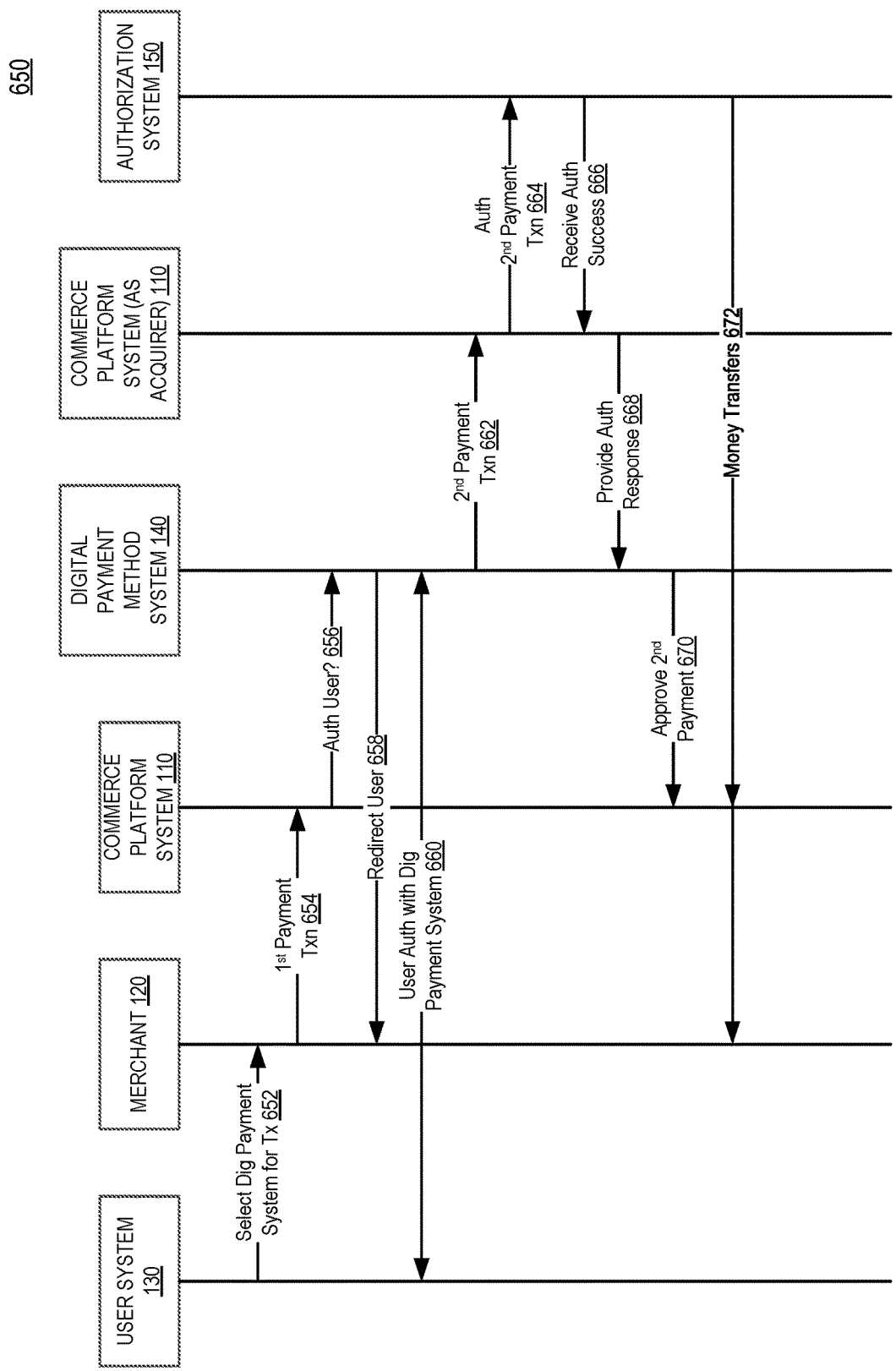
FIG. 6B is a flow diagram of another embodiment of messaging between remote systems during a process for processing a transaction between remote systems by a payment abstraction system using nested APIs.

FIG. 6B is a flow diagram of another embodiment 650 for messaging between remote systems during a process for processing a transaction between remote systems by a payment abstraction system using nested APIs. The messaging and the process for processing the transaction can be performed by processing logic that may comprise hardware (circuitry, dedicated logic, etc.), software (such as is run on a general purpose computer system or a dedicated machine), firmware, or a combination.

The process begins when a digital payment method selection for a transaction 652 is transmitted from user system 130 to merchant system 120. The transmission may include, for example, a selection within a web page user interface provided for the transaction, a mobile application having a transaction interface, a standalone application having a user interface, etc. In the embodiment of FIG. 6B, the selected payment method specifies a digital payment method associated with system 140.

The merchant system 120 then in turn transmits a first payment transaction 654 to the commerce platform system 110. As discussed above, the first payment transaction 654 may be transmitted as an API message to an API endpoint of the commerce platform system 110, and can include the user selection of a third party digital payment method selection, authentication credentials, transaction amount, merchant identifiers, user identifiers, as well as other information.

The commerce platform system 110 detects the selection of the digital payment method system 140 as the provider of the user's selected digital payment method, and then transmits 656 a request to the digital payment method system 140 to authenticate the user of user system 130. The digital payment method system 140 in turn transmits a message 658 to the merchant system 120, which causes the interface being provided to the user at user system to be redirected to an authentication interface of the digital payment method system 140. The digital payment method system 140 then interacts with the user system 130 to perform one or more authentication operations 660 (e.g., username and password verification, digital certificate verification, perform second factor authentications, etc.). Furthermore, in some embodiments, a user of user system may select the digital payment method system 140 as the system that performs payment processing. In other words, the user selects not be redirected to another system, and asks that the digital payment method system 140 manage the payment for the transaction. In other embodiments, the user selection is performed automatically.

Once the digital payment method system 140 performs a successful authentication, digital payment method system 140 generates and transmits a second transaction 662 to the commerce platform system 110. However, the commerce platform system 110 receives the second transaction as an acquirer system. Furthermore, this second transaction includes the information discussed herein indicating the user payment information, the merchant for which the transaction is performed on behalf of, and any other information that may be included to track and describe the transaction, as discussed herein.

An authorization process for the second transaction is then performed 664 with the authorization system 150. This can include the authorization system verifying payment information and user information that was provided to the commerce platform 110 in the second transaction. In response to an authorization by authorization system 150, an authorization success message is sent 666 to the commerce platform system 110 of the clearance of the transaction. This in turn can cause the commerce platform system 110 to transmit 668 an authorization response to the digital payment method system 140 indicating the clearance by the authorization system 159. This authorization response messaging can include one or more identifiers, receipts, etc. indicating the successful clearing of the transaction.

The digital payment method system 140 can then transmit 670 an approval of the second transaction to the commerce platform 110 in the commerce platform's non-acquire role, and it its transaction manager role.

Authorization system 150 further, upon successful authorization, causes a funds transfer 672 to the merchant system 120, less any fees for the transaction processing performed by commerce platform 110 and that are transferred directly to the commerce platform system 110.

In the messaging illustrated in FIG. 6B, the transaction processing operations performed in FIGS. 6A and 6B, a user may select a digital payment method for a transaction managed by the commerce platform system 110. The system providing the digital payment method, however, need not also provide payment processing services, and may instead utilize the services of the commerce platform system, which further acts as an acquirer. Therefore, the commerce platform system enables expanded service offerings to digital payment method systems, and again safeguards user financial information from exposure and unnecessary transmission.

Figure 5:
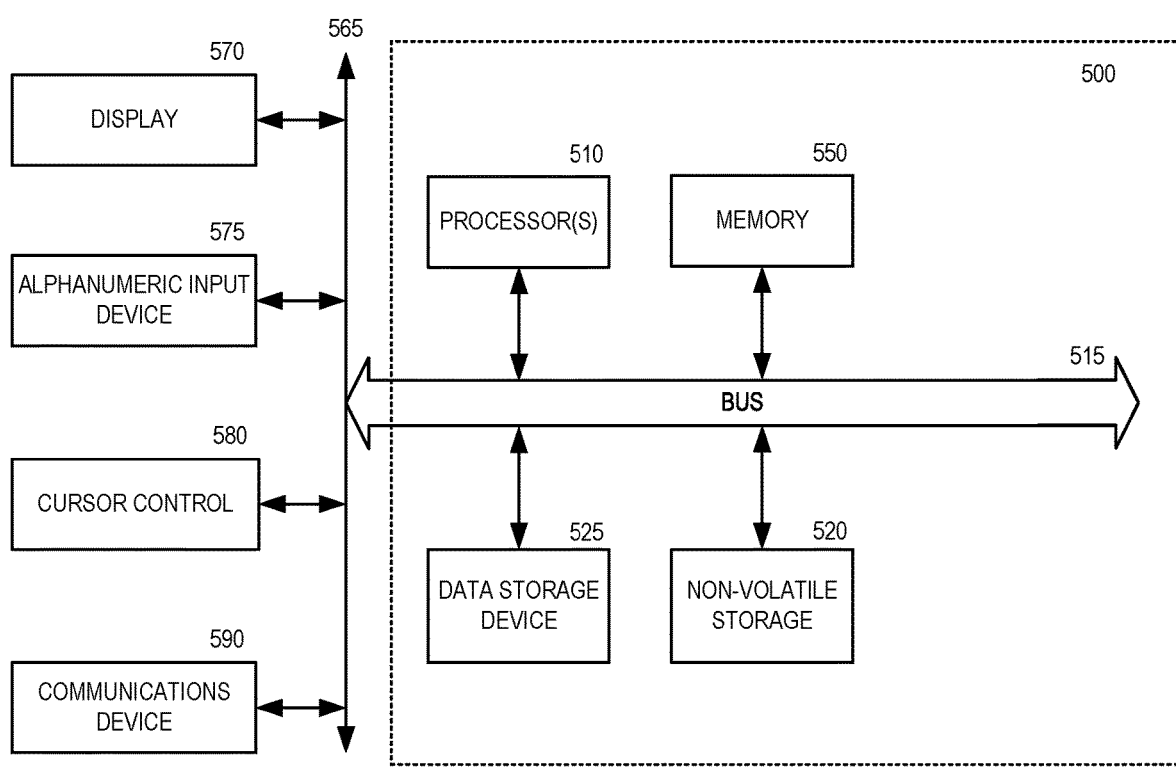
FIG. 5 is one embodiment of a computer system that may be used to support the systems and operations discussed herein.

FIG. 5 is one embodiment of a computer system that may be used to support the systems and operations discussed herein. For example, the computer system illustrated in FIG. 5 may be used by a commerce platform system, a merchant system, a user system, etc. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A first server computer system that processes requests received from a second server computer system, the first server computer system comprising:
 a memory storing at least one instruction; and
 a processing system, coupled with the memory and configured to execute the at least one instruction, which when executed cause the processing system, configures the processing system to:
  receive, by an interface of the first server computer system from the second server computer system, a first request of a user, the first request including data indicative of a user selected method for authorizing the first request, and the second server computer system having an account with the first server computer system for processing the requests,
  detect, by the first server computer system, that the received data comprises a user selection of a digital container associated with a third server computer system to be used, the digital container comprising the user selected method for authorizing the first request,
  initiate a user authorization redirection of a user computer system causing one or more user authentication operations to be performed between the user computer system and the third server computer system to authenticate the user for user of the digital container,
  in response to authentication of the user by the third server computer system for use of user selected method for authorizing the first request for authorizing the first request, receive, at the interface of the first server computer system, a second request originating from the third server computer system, the second request embedding authorization data stored by the third server computer system and associated with the user selected method for authorizing the first request, and in response to receipt of the second request originating from the third server computer system, authorize the second request with an authorization system using the authorization data associated with the user selected method for authorizing the first request to complete the first request.

2. The first server computer system of claim 1, wherein in response to receipt of the second request originating from the third server computer system, the processing system is further configured to:

add second request information to a logical ledger as an authorization ledger entry; and add an inverse of the authorization ledger entry with data indicative of the user selected method for authorizing the first request as an authorization method type ledger entry.

3. The first server computer system of claim 2, wherein in response to authorization of the second request with the authorization system, the processing system is further configured to:

add first request information to the logical ledger as an authorization completed ledger entry, and wherein the authorization method type ledger entry cancels out the authorization ledger entry.

4. The first server computer system of claim 3, wherein the second request further comprises: data indicative of the second request being on behalf of the second server computer system and data indicative of the first request.

5. The first server computer system of claim 4, wherein the authorization ledger entry, the authorization method type ledger entry, and the authorization completed ledger entry are correlated with one another based on the data indicative of the first request, the data indicative of the second request, and the data indicative of the second request being performed on behalf of the second server computer system.

6. The first server computer system of claim 1, wherein a currency associated with the first request and a currency associated with the second request authorized by the authorization system are different.

7. The first server computer system of claim 1, wherein the authorization data associated with the user selected method for authorizing the first request comprises card data.

8. The first server computer system of claim 1, wherein the processing system is further configured to:

determine a time to apply at least a portion of an amount associated with the second request against the user selected method for authorizing the first request based at least in part on one or more data; and apply the portion of the amount of the second request against the user selected method for authorizing the first request at the determined time.

9. The first server computer system of claim 1, wherein the processing system is further configured to:

receive, by the first server computer system from the authorization system, an authorization response for the second request that is based on the authorization data;

generate, by the first server computer system, a notification by removing the authorization data from the authorization response and adding an indication that the digital container was used to authorize the first request; and transmit, by the first server computer system to the second server computer system, the notification that the first request has been completed.

10. The system of claim 1, wherein the first server computer system comprises an acquirer server computer system that acts as an intermediary between the third server computer system and the authorization system.

11. A method for a first server computer system processing requests received from a second server computer system, the method comprising:

receiving, by an interface of the first server computer system from the second server computer system, a first request of a user, the first request including data indicative of a user selected method for authorizing the first request, and the second server computer system having an account with the first server computer system for processing the requests;

detecting, by the first server computer system, that the received data comprises a user selection of a digital container associated with a third server computer system to be used, the digital container comprising the user selected method for authorizing the first request;

initiating, by the first server computer system, a user authorization redirection of a user computer system causing one or more user authentication operations to be performed between the user computer system and the third server computer system to authenticate the user for user of the digital container;

in response to authentication of the user by the third server computer system for use of user selected method for authorizing the first request for authorizing the first request, receiving, at the interface of the first server computer system, a second request originating from the third server computer system, the second request embedding authorization data stored by the third server computer system and associated with the user selected method for authorizing the first request; and in response to receiving the second request originating from the third server computer system, authorizing, by the first server computer system, the second request with an authorization system using the authorization data associated with the user selected method for authorizing the first request to complete the first request.

12. The method of claim 11, wherein in response to receiving the second request originating from the third server computer system, the method further comprises:

adding second request information to a logical ledger as an authorization ledger entry; and adding an inverse of the authorization ledger entry with data indicative of the user selected method for authorizing the first request as an authorization method type ledger entry.

13. The method of claim 11, further comprising:

receiving, by the first server computer system from the authorization system, an authorization response for the second request that is based on the authorization data;

generating, by the first server computer system, a notification by removing the authorization data from the authorization response and adding an indication that the digital container was used to authorize the first request; and transmitting, by the first server computer system to the second server computer system, the notification that the first request has been completed.

14. The method of claim 12, and wherein in response to authorizing the second request with the authorization system, the method further comprises:
adding first request information to the logical ledger as an authorization completed ledger entry, and
wherein the authorization method type ledger entry cancels out the authorization ledger entry.

15. The method of claim 12, wherein the second request further comprises: data indicative of the second request being on behalf of the second server computer system and data indicative of the first request.

16. The method of claim 11, wherein the first server computer system comprises an acquirer server computer system that acts as an intermediary between the third server computer system and the authorization system.

17. A non-transitory machine readable medium having one or more instructions stored thereon, which when executed by a processing system of a first server computer system, causes the processing system to perform operations, comprising:
receiving, by an interface of the first server computer system from the second server computer system, a first request of a user, the first request including data indicative of a user selected method for authorizing the first request, and the second server computer system having an account with the first server computer system for processing the requests;
detecting, by the first server computer system, that the received data comprises a user selection of a digital container associated with a third server computer system to be used, the digital container comprising the user selected method for authorizing the first request;
initiating, by the first server computer system, a user authorization redirection of a user computer system causing one or more user authentication operations to be performed between the user computer system and the third server computer system to authenticate the user for user of the digital container;
in response to authentication of the user by the third server computer system for use of user selected method for authorizing the first request for authorizing the first request, receiving, at the interface of the first server computer system, a second request originating from the third server computer system, the second request embedding authorization data stored by the third server computer system and associated with the user selected method for authorizing the first request; and
in response to receiving the second request originating from the third server computer system, authorizing, by the first server computer system, the second request with an authorization system using the authorization data associated with the user selected method for authorizing the first request to complete the first request.

18. The non-transitory machine readable medium of claim 17, further comprising:
receiving, by the first server computer system from the authorization system, an authorization response for the second request that is based on the authorization data;
generating, by the first server computer system, a notification by removing the authorization data from the authorization response and adding an indication that the digital container was used to authorize the first request; and
transmitting, by the first server computer system to the second server computer system, the notification that the first request has been completed.

19. The non-transitory machine readable medium of claim 17, wherein in response to receiving the second request originating from the third server computer system, the operations further comprise:
adding second request information to a logical ledger as an authorization ledger entry; and
adding an inverse of the authorization ledger entry with data indicative of the user selected method for authorizing the first request as an authorization method type ledger entry.

20. The non-transitory machine readable medium of claim 19, wherein in response to authorizing the second request with the authorization system, the operations further comprise:
adding first request information to the logical ledger as an authorization completed ledger entry, and
wherein the authorization method type ledger entry cancels out the authorization ledger entry.

* * * * *